United States Patent
Kim et al.

(10) Patent No.: US 6,485,388 B2
(45) Date of Patent: Nov. 26, 2002

(54) LINE PRESSURE CONTROL SYSTEM OF AUTOMATIC TRANSMISSION

(75) Inventors: Tae-Kyun Kim; Jae-Duk Jang; Jong-Sool Park; Hyun-Soo Shim; Jin-Hee Lee; Chang-Wook Lee, all of Yongin (KR)

(73) Assignee: Hyundai Motor Company, Seoul (KR)

( * ) Notice: Subject to any disclaimer, the term of this patent is extended or adjusted under 35 U.S.C. 154(b) by 21 days.

(21) Appl. No.: 09/750,114

(22) Filed: Dec. 29, 2000

(65) Prior Publication Data

US 2001/0056004 A1 Dec. 27, 2001

(30) Foreign Application Priority Data

Jun. 21, 2000 (KR) .......................................... 00-34140

(51) Int. Cl.[7] .............................................. F16H 31/00
(52) U.S. Cl. ...................................... 475/127; 137/238
(58) Field of Search ................................. 475/127, 130, 475/131; 477/62, 168; 137/238; 192/3.29, 3.3, 3.33

(56) References Cited

U.S. PATENT DOCUMENTS

| | | | | |
|---|---|---|---|---|
| 3,650,160 A | * | 3/1972 | Higuchi et al. | 475/120 |
| 3,747,439 A | * | 7/1973 | Uozumi et al. | 477/143 |
| 4,602,529 A | * | 7/1986 | Sugano | 477/131 |
| 4,858,500 A | * | 8/1989 | Harada et al. | 180/247 |
| 5,186,204 A | * | 2/1993 | Oka et al. | 137/238 |
| 5,651,751 A | * | 7/1997 | Jang | 477/117 |
| 5,895,334 A | * | 4/1999 | Yu | 475/120 |
| 6,159,124 A | * | 12/2000 | Redinger et al. | 475/131 |
| 6,171,211 B1 | * | 1/2001 | Ortmann et al. | 477/158 |
| 6,206,802 B1 | * | 3/2001 | Kim | 475/127 |
| 6,364,802 B1 | * | 4/2002 | Yi | 475/120 |

* cited by examiner

Primary Examiner—Charles A Marmor
Assistant Examiner—David D. Le
(74) Attorney, Agent, or Firm—Birch, Stewart, Kolasch & Birch, LLP

(57) ABSTRACT

A line pressure control system of an automatic transmission includes a hydraulic pump for generating hydraulic pressure, a regulator valve for adjusting the pressure from the hydraulic pump to a predetermined level, a torque converter control valve for adjusting a partial pressure from the regulator valve, a damper clutch valve receiving the adjusted pressure from the torque converter control valve for feeding the pressure to a damper clutch, a damper clutch solenoid valve for controlling the damper clutch valve, a reducing valve for reducing a partial pressure from the regulator valve and then supplying the reduced pressure to the damper clutch control valve, wherein the regulator valve includes a valve body, first and second valve spools coaxially inserted into the valve body, a sleeve encapsulating the second valve spool, and a coil spring interposed between the first and the second valve spools.

13 Claims, 4 Drawing Sheets

LINE PRESSURE CONTROL SYSTEM OF AUTOMATIC TRANSMISSION

BACKGROUND OF THE INVENTION (a) Field of the Invention

The present invention relates to a hydraulic pressure control system of an automatic transmission capable of adjusting line pressure of the hydraulic system.

(b) Description of the Related Art

Generally, a conventional automatic transmission for a vehicle includes a multi-stage gear shift mechanism connected to a torque converter, and a plurality of friction elements actuated by hydraulic pressure for selecting a gear stage of the gear shift mechanism.

In such hydraulic control systems, hydraulic pressure generated by a hydraulic pump is selectively supplied to each friction element by a plurality of control valves such that automatic shifting is realized in accordance with a driving state of the vehicle and engine throttle opening.

The above hydraulic control system generally comprises a pressure regulating controller for controlling hydraulic pressure generated by the hydraulic pump, manual and automatic shift controllers for selecting a shift mode, a hydraulic pressure controller for controlling shift response and shift quality, a damper clutch controller for actuating a damper clutch of the torque converter, and a hydraulic pressure distributor for supplying an appropriate amount of hydraulic pressure to each of the friction elements.

The hydraulic pressure distributor distributes a variable amount of pressure in accordance with an ON/OFF or duty operation of solenoid valves by a transmission control unit such that shift control is realized.

FIG. 4 shows a conventional line pressure control system in such a hydraulic system.

As shown in FIG. 4, the hydraulic pressure generated by the hydraulic pump 200 is adjusted so as to have a predetermined level of line pressure, by a regulator valve 202. Partially, the regulated line pressure is adjusted by a torque converter control valve 204 and then supplied to a damper clutch valve 206 under control of the damper clutch solenoid valve S1, and partially the pressure level of the line pressure is reduced so to be supplied to the damper clutch control valve 206 or to friction elements via hydraulic pressure control means and hydraulic pressure distribution means by driver's manipulation of a manual valve 210, that converts ports so as to direct the pressure to appropriate lines.

The regulator valve 202 is controlled by pressure from the manual valve 210 via a forward pressure line 212 in ranges of N, D, 2, and L; by pressure via a pressure line 214 which is connected to the friction elements that operate in third and fourth speed of D range; and by reverse pressure via a reverse pressure line 216 connected to the main valve 210 in range R.

In this conventional line pressure control system, however, since the pressure control is performed by pressure from the lines 212, 214, and 216 biasing the valve spool of the manual valve, and an elastic force of a spring 218, it is difficult to electrically and actively control the line pressure, resulting in mileage reduction of the vehicle.

SUMMARY OF THE INVENTION

The present invention has been made in an effort to solve the above problems.

It is an object of the present invention to provide a line pressure control system of an automatic transmission capable of maintaining optimal line pressure in a present running condition so as to improve gasoline mileage, and making a line pressure control range broader using a full line pressure control mechanism by adapting a line pressure control solenoid valve.

To achieve the above object, the line pressure control system of an automatic transmission of the present invention comprises a hydraulic pump for generating hydraulic pressure, a regulator valve for adjusting the pressure from the hydraulic pump to a predetermined level, a torque converter control valve for adjusting a partial pressure from the regulator valve, a damper clutch valve receiving the adjusted pressure from the torque converter control valve for feeding the pressure to a damper clutch, a damper clutch solenoid valve for controlling the damper clutch valve, a reducing valve for reducing a partial pressure from the regulator valve and then supplying the reduced pressure to the damper clutch control valve, wherein the regulator valve comprises a valve body, a first and a second valve spool coaxially inserted into the valve body, a sleeve encapsulating the second valve spool, and a coil spring interposed between the first and the second valve spools.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

Preferred embodiments of the present invention will be described hereinafter with reference to the accompanying drawings.

Figure 1:
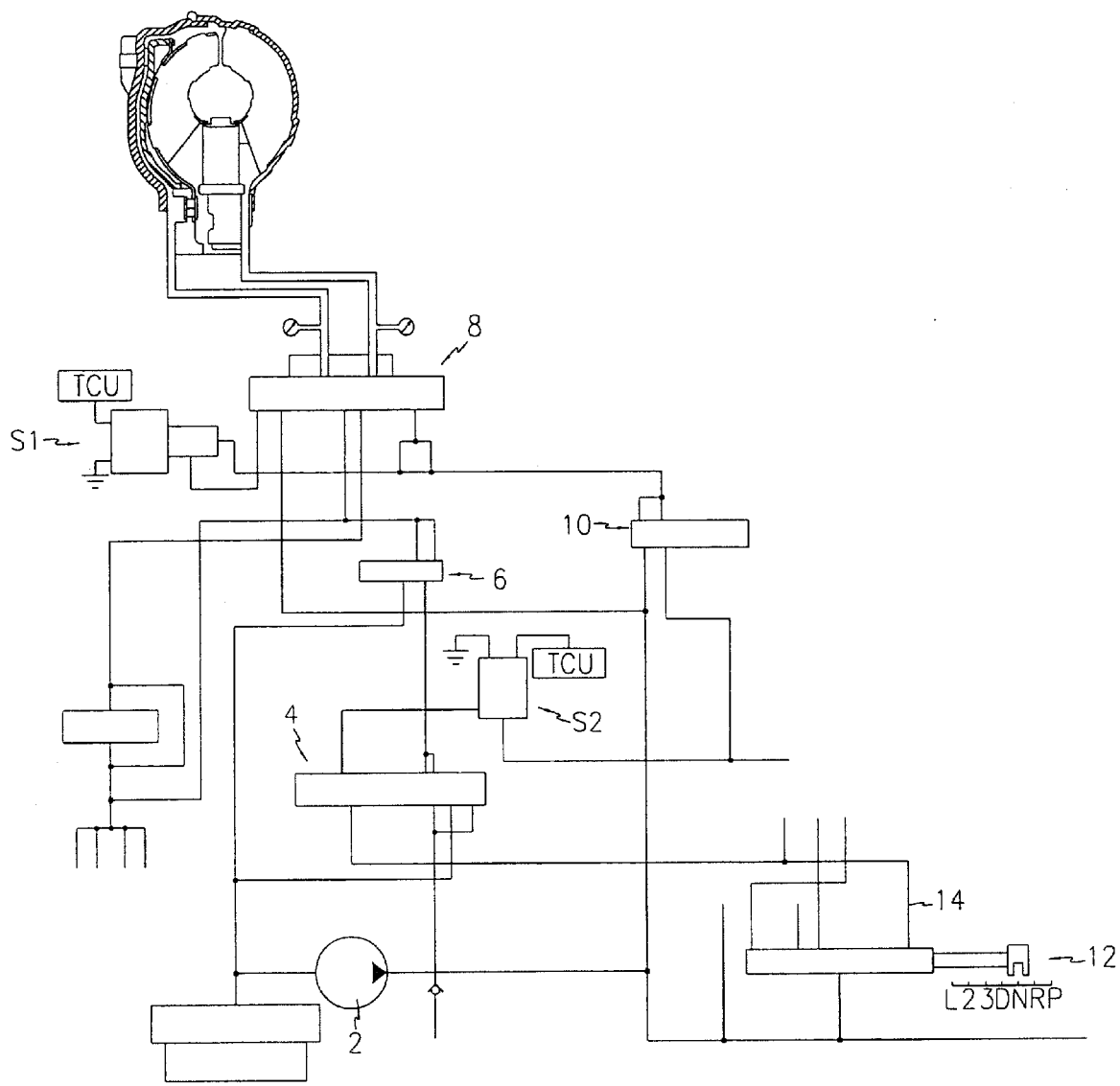
FIG. 1 is a hydraulic circuit diagram of a line pressure control system according to a preferred embodiment of the present invention.

As shown in FIG. 1, hydraulic pressure generated by a hydraulic pump 2 is adjusted so as to have a predetermined level of line pressure, by a regulator valve 4. Partially, the regulated line pressure is adjusted by a torque converter control valve 6 and then supplied to a damper clutch valve 8 under control of the damper clutch solenoid valve S1, and partially the line pressure is reduced by a reducing valve 10 so as to be supplied to the damper clutch control valve 8 or to friction elements via hydraulic pressure control means and hydraulic pressure distribution means, that convert ports so as to direct the pressure to appropriate lines by driver's manipulation of a manual valve 12.

The regulator valve 4 communicates with the reducing valve 10 through a pressure line under control of a line pressure control solenoid valve S2 interposed on the pressure line, and with the manual valve 12 through a reverse pressure line 14. The line pressure is controlled by the line pressure control solenoid valve S2 except for in reverse range.

Figure 2:
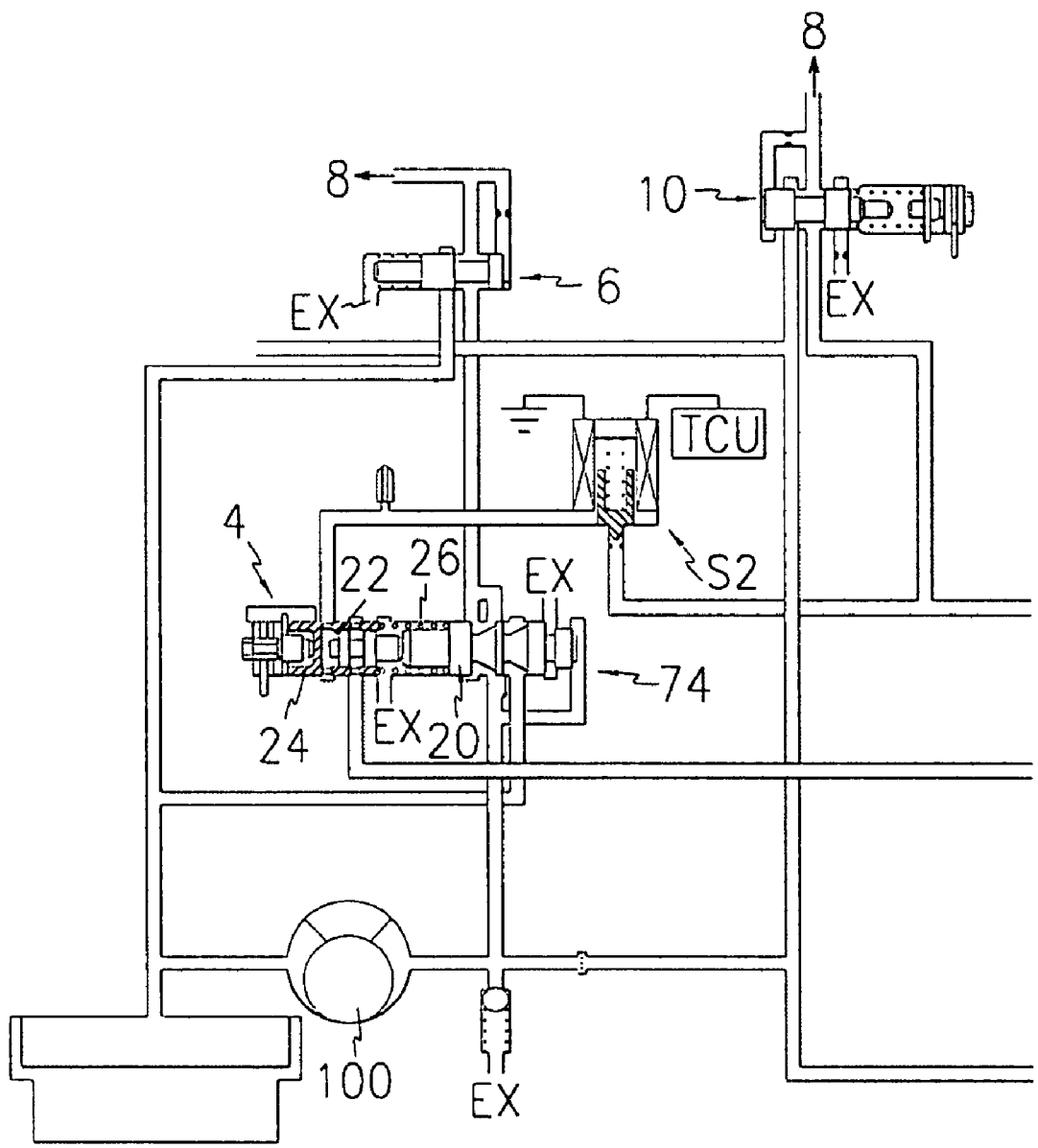
FIG. 2 is a detailed view of the line pressure control system of FIG. 1.
Figure 3:
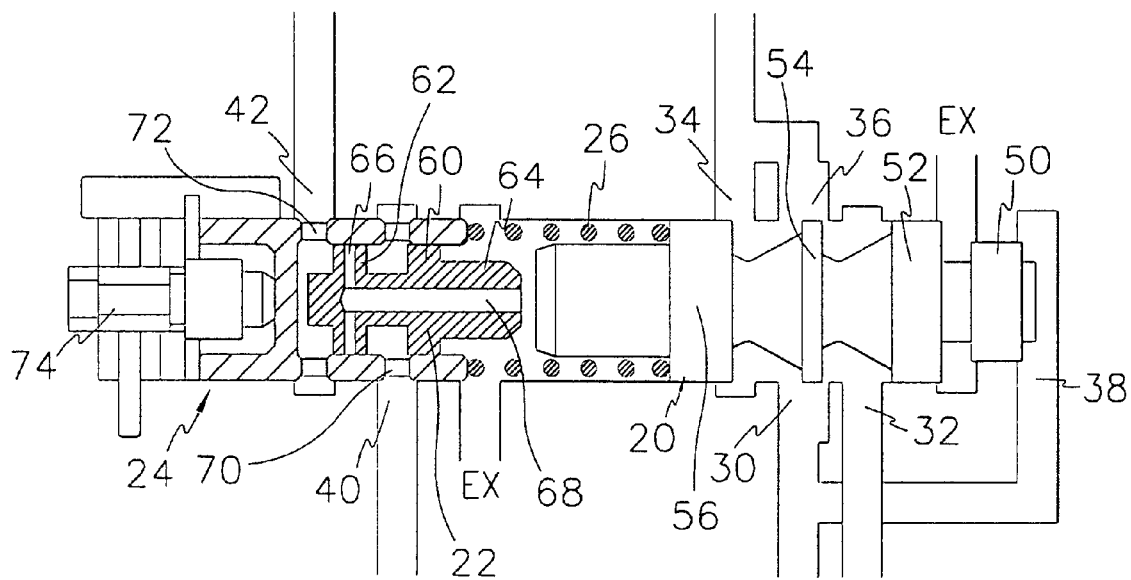
FIG. 3 is an enlarged view of a regulator valve of the line pressure control system of FIG. 2.
Figure 4:
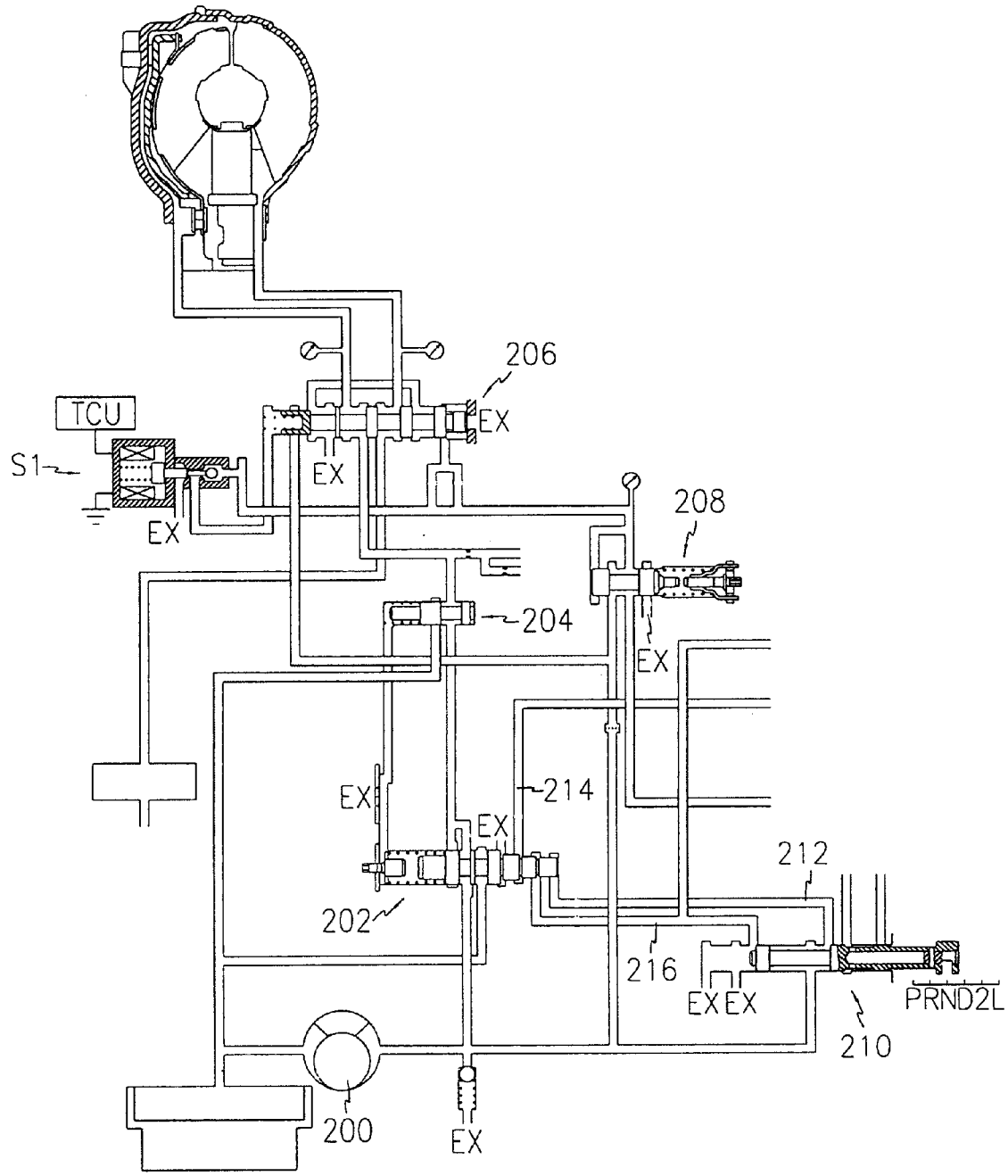
FIG. 4 is a hydraulic circuit diagram of a conventional line pressure control system.

FIG. 2 and FIG. 3 respectively are a detailed view of the line pressure control system and an enlarged view of a regulator valve of the line pressure control system.

The regulator valve 4 comprises a valve body, first and second valve spools 20 and 22 in the valve body, a sleeve 24 encapsulating the second valve spool 22, and a coil spring 26 interposed between the first valve spool 20 and the sleeve 24.

The valve body of the regulator valve 4 is provided with a first port 30 for receiving pressure from the oil pump 2, a second port 32 for returning the pressure from the first port 30, a third port 34 for supplying the pressure to the torque converter control valve 6, a fourth port 36 communicated with the first port 30 and communicating with a downstream end portion of the third port 34, a fifth port 38 separated from an upstream end portion of the first port 30 so as to supply control pressure to the first valve spool 20, a sixth port 40 communicating with the reverse pressure line 14, and a seventh port 42 for receiving control pressure from the line pressure control solenoid valve S2.

The first valve spool 20 installed in the valve body is provided with a first land 50 formed at a right end portion of the first valve spool on which the pressure from the fifth port 38 is applied, a second land 52 formed close to the first land 50, a third land 54 interposed between the first and the second ports 30 and 32, and a fourth land 56 formed on a left side of the first valve spool for selectively communicating the first and the third ports 30 and 34.

The second valve spool 22 arranged at a left side of the fourth land 56 of the first valve spool 20 is provided with first and second lands 60 and 62 formed with a predetermined distance, a projection 64 formed at a right end of the second valve spool 22 for contacting a projection 58 of the first valve spool 20.

The second valve spool is provided with a vertical hole 66 vertically penetrating the second land 62 by passing an axial center of the second valve spool 22 and a horizontal hole 68 formed from the right end of the second valve spool 22 to the vertical hole 66 along an axis of the second valve spool 22.

The sleeve 24 encapsulating the second valve spool 22 is provided with a first opening 70 formed between the first and the second lands 60 and 62 of the second valve spool 22 for communicating with the sixth port 40 of the valve body, and a second opening 72 formed to the left side of the second land 62 of the second valve spool 22 for communicating with the seventh port 42 of the valve body for applying control pressure to the second land 62 of the second valve spool 22.

On the left side of the second valve spool 22, an adjust screw 74 is installed such that it is possible to adjust the elastic force of the coil spring 26 between the first and the second valve spools 20 and 22 by moving the sleeve 24 by screwing the adjust screw 74, basically determining the line pressure.

That is, the pressure supplied from the first and the fifth ports 30 and 38 and the elastic force of the coil spring 26 cooperate so as to move the first valve spool such that the line pressure is determined by the amount of fluid returned through the second port 32.

The pressure fed from the line pressure control solenoid valve S2 is applied on the second land 62 of the second valve spool 22 such that the second valve spool 22 moves to the right. Accordingly, the projection 64 of the second valve spool 22 contacts the projection 58 of the first valve spool 20 so as to push the first valve spool 22 to the right such that the line pressure adjustment is achieved.

This line pressure control is defined by the size of the lands of the first and the second valve spools 20 and 22 whereon the pressure is applied and the pressure level supplied from the first, fifth, and seventh ports 30, 38, and 42. The size of the lands and the applied pressure have the following relationship:

In forward driving range, $$A1 \times Pd = Fs + A3 \times Ps$$

$$Pd = (A3/A1) \times Ps + (Fs/A1)$$

In reverse range, $$A1 \times Pr = Fs + A3 \times Ps + (A2-A3) \ Pr$$

$$(A1-A2+A3) \times Pr = Fs + A3 \times Ps$$

$$Pr = \{A3/(A1-A2+A3)\} \times Ps + Fs/(A1-A2+A3)$$

In any of the above equations, the relationship can be expressed as $Pl = a \times Ps \times b$ ("a" and "b" are constants consisting of A1, A2, A3, and Fs).

Wherein,

Ps: S2 control pressure

Ex: exhaust port

Pr: reverse line pressure

Pc: torque converter control valve pressure

Pl: line pressure

Psu: pump return pressure

Pd: forward line pressure

Fs: elastic force of coil spring

A1: first land size of first valve

A2: first land size of second valve

A3: second land size of second valve.

Accordingly, the line pressure can be controlled by adjusting the control pressure using the line pressure control solenoid valve S2.

The sleeve 24 is used so as to utilize the valve body, especially when processing the valve body without changing the tooling of the valve spool 20, and to easily adapt to change of the reverse pressure to the forward pressure and vice versa.

The vertical hole 66 and the horizontal hole 68 of the second valve spool 22 are formed so as to prevent the pressure level from being changed by pressure leakage between the control pressure of the line pressure control solenoid valve S2 and the reverse pressure such that unexpected pressure is exhaust.

Even though an exhaust port can be directly arranged, the direct arrangement of the exhaust port requires addition of a land to the valve spool 22 such that the valve and the sleeve should be longer, resulting in layout limitations in designing the valve body.

As described above, in the line pressure control system of the automatic transmission of the present invention, the pressure from the reducing valve to the regulator valve is controlled by the line pressure control solenoid valve such that the line pressure can be optimized in accordance with the present running condition, which improves gasoline mileage and broadens the control range during the gear shift operation.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A line pressure control system of an automatic transmission comprising:
   a hydraulic pump for generating hydraulic pressure;
   a regulator valve for adjusting the pressure from the hydraulic pump to a predetermined level;
   a torque converter control valve for adjusting a partial pressure from the regulator valve;
   a damper clutch valve receiving the adjusted pressure from the torque converter control valve for feeding the pressure to a damper clutch;
   a damper clutch solenoid valve for controlling the damper clutch valve;
   a reducing valve for reducing a partial pressure from the regulator valve and then supplying the reduced pressure to the damper clutch control valve; and
   a manual valve for providing hydraulic pressure to friction elements via hydraulic pressure control means and hydraulic pressure distribution means by driver's manipulation of a manual valve,
   wherein the regulator valve comprises:
      a valve body;
      a first and a second valve spool coaxially inserted into the valve body;
      a sleeve encapsulating the second valve spool;
      a coil spring interposed between the first and the second valve spools,
      wherein the second valve spool communicates with the reducing valve via a line pressure control solenoid valve and the manual valve so as to be controlled by control pressure of the line pressure control solenoid valve and reverse pressure of the manual valve.

2. A line pressure control system of claim 1 wherein the first valve spool is controlled by the line pressure and elastic force of the coil spring.

3. A line pressure control system of claim 1 wherein the valve body comprises:
   a first port for receiving pressure from the hydraulic pump;
   a second port for returning the pressure from the first port;
   a third port for supplying the pressure from the first port to the torque converter;
   a fourth port communicating with the first port and downstream of the third port;
   a fifth port separated from upstream of the first port for supplying control pressure to the first valve spool;
   a sixth port communicating with a reverse pressure line; and
   a seventh port for receiving control pressure from the line pressure comtrol xolenoid valve.

4. A line pressure control system of claim 1 wherein the first valve spool comprises:
   a first land on which the hydraulic pressure from the fifth port is applied;
   a second land closely formed with the first land;
   a third land formed between the first and the second ports;
   a fourth land for selectively communicating the first and the third ports; and
   a projection having a predetermined length formed on the fourth land in a longitudinal direction of the first valve spool.

5. A line pressure control system of claim 1 wherein the second spool comprises a first and a second land with a predetermined distance therebetween and a projection formed so as to contact one end of the projection of the first valve spool in a longitudinal direction and arranged inside the sleeve in such a way that a first opening of the sleeve for communicating with the sixth port and a second opening of the sleeve for communicating with the seventh port are positioned between the first and the second land of the second valve spool.

6. A line pressure control system of claim 5 wherein the second land is provided with a vertical hole penetrating the second land by passing through an axial center of the second valve spool and a horizontal hole formed from one longitudinal end of the second valve spool to the vertical hole along the axis of the second valve spool.

7. A line pressure control system of claim 1 wherein the sleeve is provided with an adjuster screw on an outer end portion of the valve for adjusting the elastic force of the coil spring by moving the sleeve by screwing the adjust screw.

8. A line pressure control system of an automatic transmission comprising:
   a hydraulic pump for generating hydraulic pressure;
   a regulator valve for adjusting the pressure from the hydraulic pump to a predetermined level;
   a torque converter control valve for adjusting a partial pressure from the regulator valve;
   a damper clutch valve receiving the adjusted pressure from the torque converter control valve for feeding the pressure to a damper clutch;
   a damper clutch solenoid valve for controlling the damper clutch valve;
   a reducing valve for reducing a partial pressure from the regulator valve and then supplying the reduced pressure to the damper clutch control valve; and
   a manual valve for providing hydraulic pressure to friction elements via hydraulic pressure control means and hydraulic pressure distribution means by driver's manipulation of a manual valve,
   wherein the regulator valve comprises:
      a valve body;
      a first and a second valve spool coaxially inserted into the valve body;
      a sleeve encapsulating the second valve spool;
      a coil spring interposed between the first and the second valve spools,
   wherein the valve body comprises:
      a first port for receiving pressure from the hydraulic pump;
      a second port for returning the pressure from the first port;
      a third port for supplying the pressure from the first port to the torque converter;
      a fourth port communicating with the first port and downstream of the third port;
      a fifth port separated from upstream of the first port for supplying control pressure to the first valve spool;
      a sixth port communicating with a reverse pressure line; and
      a seventh port for receiving control pressure from the line pressure control solenoid valve.

9. A line pressure control system of claim 8 wherein the first valve spool is controlled by the line pressure and elastic force of the coil spring.

10. A line pressure control system of claim 8 wherein first valve spool comprises:
    a first land on which the hydraulic pressure from the fifth port is applied;

a second land closely formed with the first land;

a third land formed between the first and the second ports;

a fourth land for selectively communicating the first and the third ports; and a projection having a predetermined length formed on the fourth land in a longitudinal direction of the first valve spool.

11. A line pressure control system of claim 8 wherein the second spool comprises a first and a second land with a predetermined distance therebetween and a projection formed so as to contact one end of the projection of the first valve spool in a longitudinal direction and arranged inside the sleeve in such a way that a first opening of the sleeve for communicating with the sixth port and a second opening of the sleeve for communicating with the seventh port are positioned between the first and the second land of the second valve spool.

12. A line pressure control system of claim 11 wherein the second land is provided with a vertical hole penetrating the second land by passing through an axial center of the second valve spool and a horizontal hole formed from one longitudinal end of the second valve spool to the vertical hole along the axis of the second valve spool.

13. A line pressure control system of claim 8 wherein the sleeve is provided with an adjuster screw on an outer end portion of the valve for adjusting the elastic force of the coil spring by moving the sleeve by screwing the adjust screw.

* * * * *